Dec. 2, 1958 L. DAVIS, JR 2,863,119

TRANSISTOR TESTING SYSTEMS

Filed Sept. 30, 1954

INVENTOR
LUTHER DAVIS, JR.
BY Elmer J. Gorn
ATTORNEY

United States Patent Office 2,863,119
Patented Dec. 2, 1958

2,863,119

TRANSISTOR TESTING SYSTEMS

Luther Davis, Jr., Belmont, Mass., assignor to Raytheon Manufacturing Company, Waltham, Mass., a corporation of Delaware Application September 30, 1954, Serial No. 459,339

5 Claims. (Cl. 324—158)

This invention relates generally to electrical translation devices of the class commonly called transistors, and more particularly to a novel system and method of measuring the base width of junction type transistors either during the fabrication process or after the device has been completely constructed.

Transistors of the so-called junction type, as is well known in the art, are composed of a body of semiconducting material having layers of the same conductivity type designated as the emitter region and collector region, between which is sandwiched a minute layer of the material having a different conductivity, and designated as the base region. Since various desirable operating characteristics of the transistor, for example, the current gain $\alpha$, are known to depend directly on the physical width of the base layer, it has become expedient in the production of transistors to provide means for measuring this width to determine whether it is within the tolerable limits for the most efficient operation of the device. With presently utilized techniques, this usually necessitates mechanically sectioning the semiconducting body, and then chemically treating the surface thereof to delineate the line of demarcation between the layers of different conductivity type in order to visually check the base width. This procedure has been found to be highly unsatisfactory since it requires the physical destruction of the unit, and therefore cannot be used to test the base width of a finished transistor, nor can the base width of each unit be checked.

In accordance with the present invention an improved means of base width determination is provided which eliminates the disadvantages inherent in previously known methods. To accomplish this result, electrical means are provided to measure the time interval necessary for current carriers injected into the base to diffuse across the base to the collector region, the time interval in conjunction with a specially derived formula giving an accurate measurement of the base width.

Figure 1:
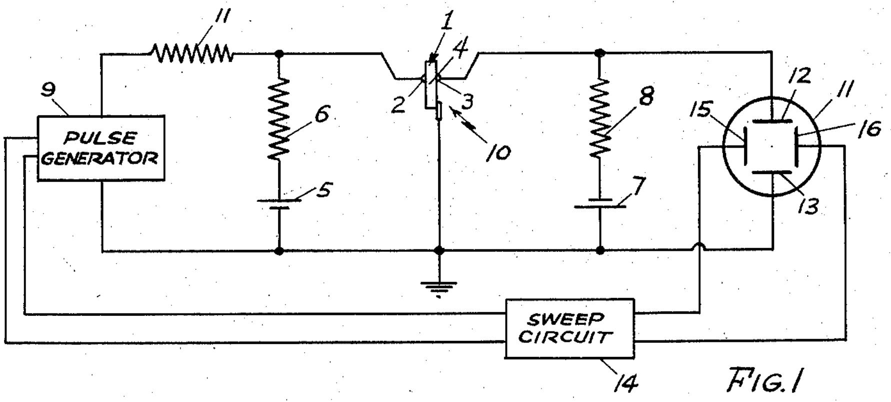
Figure 2:
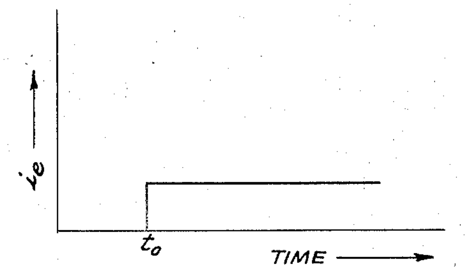
Figure 3:
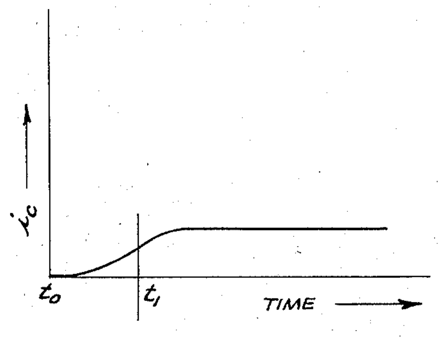

The invention will be better understood as the following description proceeds taken in conjunction with the accompanying drawings wherein:

Fig. 1 is a schematic drawing partly diagrammatic of a base width measuring arrangement in accordance with the present invention; and Figs. 2 and 3 are curves useful in explaining the invention.

Referring now to the drawings, and more particularly to Fig. 1, there is shown generally at 10 a junction type transistor comprising a body of semiconducting material 1, which may be germanium, having an emitter region 2, a collector region 3, and a base region 4 which is connected to ground. Connected between emitter 2 and base 4 are a biasing source, such as a battery 5 and a resistor 6. Connected between the collector 3 and the base 4, there is also a biasing source, such as a battery 7 and a resistor 8. Transistor 10 may be of the PNP type; i. e. the emitter region 2 and collector region 3 are of p-type conductivity, while the base region 4 is of n-type conductivity. In this case battery 5 will ordinarily have its positive pole connected to the emitter 2, and battery 7 will have its negative pole connected to the collector 3. It should be understood that transistor 10 may also be of the NPN type in which case the polarities of the biasing battery connections would be reversed. A pulse generator 9, of any standard commercial kind, is connected to the emitter 2 through a large resistance 11, and provides a means for injecting current carriers into the base region 4 from whence they will diffuse to the collector 3.

In transistor operation there is a finite time required for the diffusion of current carriers across the base from the emitter to the collector. Under normal operation at low currents, the injected carriers move across the base region by a diffusion process due to the concentration gradient of the injected carriers in the base region. It has been found that the transit time involved may be represented by the expression $$T_0=\frac{W^2}{2D}$$

where:

$T_0$ is the transit time of the injected carriers for a constant current, $W$ is the width of the base region from emitter to collector, and $D$ is the diffusion constant of the injected carriers.

This equation holds for normally small values of W, for example, on the order of one to ten mils, so that for all practical base widths it is satisfactorily accurate. When a pulse of current is to be used, the above expression is modified to the form $$T=\frac{W^2}{2D\ln 2}$$

where T is now the transit time of the pulse of injected current carriers, and "$ln2$" is the natural logarithm of 2.

Transposing the equation to the form $$W=\sqrt{2DT\ln 2}$$

thus produces a means for measuring the base width in terms of the transit time of the injected carriers.

In accordance with the present invention, a current pulse may be fed from the generator 9 into the emitter 2, thereby injecting a pulse of carriers into the base region 4. The pulse should have a rise time short in comparison to the transit time, and may be a step pulse as shown in Fig. 2. A pulse repetition rate of the order of 300 cycles may be used. In order to measure the delay time of the carriers in arriving at collector 3, the voltage developed across resistor 8 as the pulse passes is impressed on the vertical plates 12 and 13 of a synchroscope 11. In Fig. 3 is shown the wave form of current proportional to the voltage across resistor 8 as it would appear on the synchroscope 11. Pulse generator 9 triggers the sweep voltage applied to horizontal plates 15 and 16 from sweep circuit 14 in order to establish reference time $t_0$. The time interval between $t_0$ and $t_1$ represents the transit time of the injected carriers, since the transit time equation was derived on the basis of the collector current reaching a half amplitude value. It is evident that synchroscope 11 may be provided with calibrations in order to read base width directly, or may be time calibrated in which case the delay time would be substituted in the transit time equation to determine the base width.

In a preferred embodiment of the invention, resistor 11 may have a value of the order of two megohms, and resistor 6 a value of the order of 45,000 ohms. However, these values are not critical, the only requirement being that resistor 11 be large compared to resistor 6 in order to provide for constant current to the emitter. The value of resistor 8 is kept low, for example, on the order of 100 ohms, in order to keep the time constant associated with the collector capacitance smaller than the transit time of the injected carriers.

Although there has been described what is considered a preferred embodiment of the invention, various adaptations and modifications thereof may be made without departing from the spirit and scope of the invention as defined in the appended claims.

What is claimed is:

1. A system for measuring the base width of a junction type transistor having an emitter region, a collector region, and a base region comprising means connected to said emitter region and said base region for injecting current carriers into said base region, said current carriers requiring a finite time to diffuse across said base region to said collector region, and means connected to said collector region and said base region for determining said diffusion time whereby a measure of the width of said base region is obtained.

2. A system for measuring the base width of a junction type transistor having an emitter region, a collector region, and a base region comprising a generator connected to said emitter region and said base region for applying a current pulse to said emitter region whereby current carriers requiring a finite time to diffuse across said base region to said collector region are injected into said base region, and a synchroscope connected to said collector region and said base region for determining said diffusion time whereby a measure of the width of said base region is obtained.

3. A system for measuring the base width of a junction type transistor having an emitter region, a collector region, and a base region comprising a generator connected between said emitter and base regions and adapted to apply a current pulse to said emitter region whereby current carriers having a finite transit time are injected into said base region, said current pulse having a rise time short in comparison to said transit time, and said transit time conforming to the expression $$T=\frac{W^2}{2D\ln 2}$$

where:

T is the transit time necessary for said carriers to diffuse across said base region to said collector region, W is the width of said base region, and D is the diffusion constant of said carriers, and a synchroscope connected to said collector region and said base region and adapted to determine said transit time in accordance with said expression whereby a measure of said base width is obtained.

4. A system for measuring the base width of a junction type transistor having an emitter region, a collector region, and a base region comprising a generator connected to said emitter region and said base region for applying a current pulse to said emitter region whereby current carriers requiring a finite time to diffuse across said base region to said collector region are injected into said base region, and a synchroscope connected to said collector region and said base region and having its sweep synchronized with said current pulse for determining said diffusion time whereby a measure of the width of said base region is obtained.

5. A system for measuring the base width of a junction type transistor having an emitter region, a collector region, and a base region comprising means connected to said emitter region and said base region for injecting current carriers into said base region, said current carriers requiring a finite transit time to move across said base region to said collector region, and means connected to said collector region and said base region for determining said transit time whereby a measure of the width of said base region is obtained.

References Cited in the file of this patent

UNITED STATES PATENTS

| | | |
|---|---|---|
| 2,345,932 | Gould | Apr. 4, 1944 |
| 2,566,699 | Frommer | Sept. 4, 1951 |
| 2,603,694 | Kircher | July 15, 1952 |
| 2,618,686 | LeLange | Nov. 18, 1952 |
| 2,677,106 | Haynes et al. | Apr. 27, 1954 |
| 2,790,141 | Geppert | Apr. 23, 1957 |

OTHER REFERENCES

Journal of Scientific Instruments, vol. 29, May 1952, pages 142 to 145, article by Chaplin.